Patented July 15, 1924.

1,501,419

UNITED STATES PATENT OFFICE.

EMIL PODSZUS, OF FRIEDRICHSHAGEN, NEAR BERLIN, GERMANY.

PROCESS OF PRODUCING BORON CARBIDE.

No Drawing. Application filed January 4, 1921. Serial No. 435,006.

*To all whom it may concern:*

Be it known that I, Dr. EMIL PODSZUS, citizen of Germany, residing at Friedrichshagen, near Berlin, 33 Schoneicher Chaussee, Brandenburg, Prussia, Germany, have invented certain new and useful Improvement in Processes of Producing Boron Carbide (Germany, filed March 22, 1916, Patent No. 327,509; France, filed March 30th, 1921, Patent No. 538,430; Holland, filed June 16, 1923, Patent No. 9,608; Belgium, filed March 24th, 1921, Patent No. 294,857; Switzerland, filed March 15, 1921, Patent No. 95,368; Sweden, filed March 29th, 1921, Patent No. 52,735), of which the following is a specification.

Because of the manifold properties of carbides, i. e. their great hardness, their constancy of temperature and their electric conductivity, which make them useful respectively as grinding mediums and as resistance heating bodies, many different processes have already been devised for their manufacture. In the following is described a process of producing boron carbide, which is distinguished from other carbides by a special degree of hardness, constancy of temperature and resistance.

According to this new process, one starts with nitrid, preferably baron nitrid, which is reduced by carbon. The carbon is added to the boron nitrid, either directly in being very uniformly distributed therein, or it is added thereto by means of a carbon containing gas, which at high temperatures yields carbon to the nitrid. If the mixture is sufficiently heated (above 2000° C.) the carbon removes the nitrogen, while cyanic gas is formed. If the uniformity of the bodies to be produced is of no particular importance, it suffices to embed the nitrid in carbon, but if, on the other hand, it is desired to obtain uniform bodies, it is necessary to distribute the carbon in a very finely divided state in the nitrid in amounts sufficient to effect the reaction. This can be accomplished also in this way that carbon is introducted while it is separated at high temperatures in a very finely divided state from gases, e. g. illuminating gas, hydrogen with carbon disulfide, ammonia which has been exposed to the action of carbon at a high temperature, and the like. The reduction is then obtained by a subsequent increase in temperature. The composition of the final product depends on the amount of the added carbon. If only enough carbon is used as is required for the reduction, products are obtained which consist almost solely of boron, containing only little carbide. By increasing the added amount of carbon, one obtains pure carbide and finally carbon containing carbide.

It is advisable to increase the temperature as much as possible, up to nearly 3000° C., because in that case an automatic separation of the boron nitrid occurs. It is necessary to remove as much as possible free oxygen and nitrogen, or to keep the same away. If it is desired to produce moulded bodies from boron carbide or mixtures thereof with boron and carbon, the said bodies can first be made from the boron nitrid, after which the bodies are reduced by the above described process.

The manufacture of the boron nitrid can be undertaken in one operation from boron tri-oxide in the presence of carbon. If in the beginning sufficient carbon has been added, a further considerable increase in the temperature will result in boron carbide, or mixtures thereof with boron or carbon. If the temperature is increased very much, the material is melted, and a mass is obtained which is particularly adapted for grinding purposes, since it is the molten particles which impart the desired hardness to the material.

According to my invention, I proceed about as follows in order to obtain boron carbide melts. To the boron nitrid is added, very finely distributed, a sufficient amount of carbon to effect the reduction. The mixture which has a slight conductivity and is embedded in heat insulators is highly heated by an electric current in an indifferent atmosphere, until reduction and finally melting occurs. The gases formed during the reduction escape with great violence.

For the manufacture of tubes or spirals from boron carbide, or mixtures thereof with other substances, e. g. boron or carbon, my process is carried out as follows: The desired shape of the body is moulded from the boron nitrid or the starting material therefor. This moulded body is exposed to the action of a carbon containing atmosphere, for instance, within a carbon pipe. Preferably, particles of carbon are added, after which the body is exposed, for a moderate period of time at a temperature up to about 2000° C., to the action of a current of ammonia. If hydrogen and carbon disulfide are used, the process is a little slower. Especially suitable as heating mediums are pipes made of boron carbide, since these are scarcely affected by the atmosphere, and therefore can be permanently used. The entire process is concluded in a very few hours. The bodies obtained by the process are distinguished by great solidity and homogeneity. Their resistance is many times greater than that of carbon and may be as much as twenty times greater. The temperature coefficient is nearly zero and only very slightly negative. The fireproof quality is very high. The bodies resist for a long time temperatures of 2000°. Because of these characteristics the bodies are better suited than carbon to electrical heating purposes. By a further increase in temperature one easily succeeds in melting the bodies. One can easily obtain the molten bodies in larger amounts, in one operation, if an electric arc is used as the source of heat, which burns embedded in the mass. Also in this case the use of boron nitrid and carbon or of a carbon atmosphere is required. And also in this case it is advisable to expose the boron nitrid, preferably mixed in pieces with carbon, to the action of the electric arc, in an atmosphere of ammonia. If sufficiently long exposed, the pure carbide is soon melted, if the proportion between carbon and nitride has been correctly selected. The boron carbide thus obtained is highly suited to the well-known technical purposes.

I claim as my invention:

1. The process of producing boron carbide which consists in adding carbon to boron nitrid and then heating the mixture until reduction occurs.

2. The process as specified in claim 1, in which the temperature used is increased to such a degree as to effect the melting of the mass.

3. The process as specified in claim 1, in which the contents of the boron carbide in the final product is controlled by the amount of carbon added.

4. The process as specified in claim 1, in which the carbon added to the boron nitrid is separated at a high temperature from carbon containing gases.

5. The process as specified in claim 1, in which the carbon added to the boron nitrid is separated at a high temperature from carbon containing gases, the carbon containing gas being produced by the action of ammonia on carbon.

In testimony whereof I hereunto affix my signature in the presence of two witnesses.

Dr. EMIL PODSZUS.

Witnesses:
  Paul Neumann,
  Otto Müller.